Sept. 29, 1964     C. W. RAINEY     3,151,285
ELECTRICAL GENERATOR

Filed Aug. 19, 1959     3 Sheets—Sheet 1

CHALLENOR W. RAINEY
*INVENTOR.*

BY John B. Faulkner
Keith L. Zerschling

ATTORNEYS

Sept. 29, 1964

C. W. RAINEY 3,151,285

ELECTRICAL GENERATOR

Filed Aug. 19, 1959

CHALLENOR W. RAINEY
*INVENTOR.*

BY John R. Faulkner
Keith L. Zerschling

ATTORNEYS

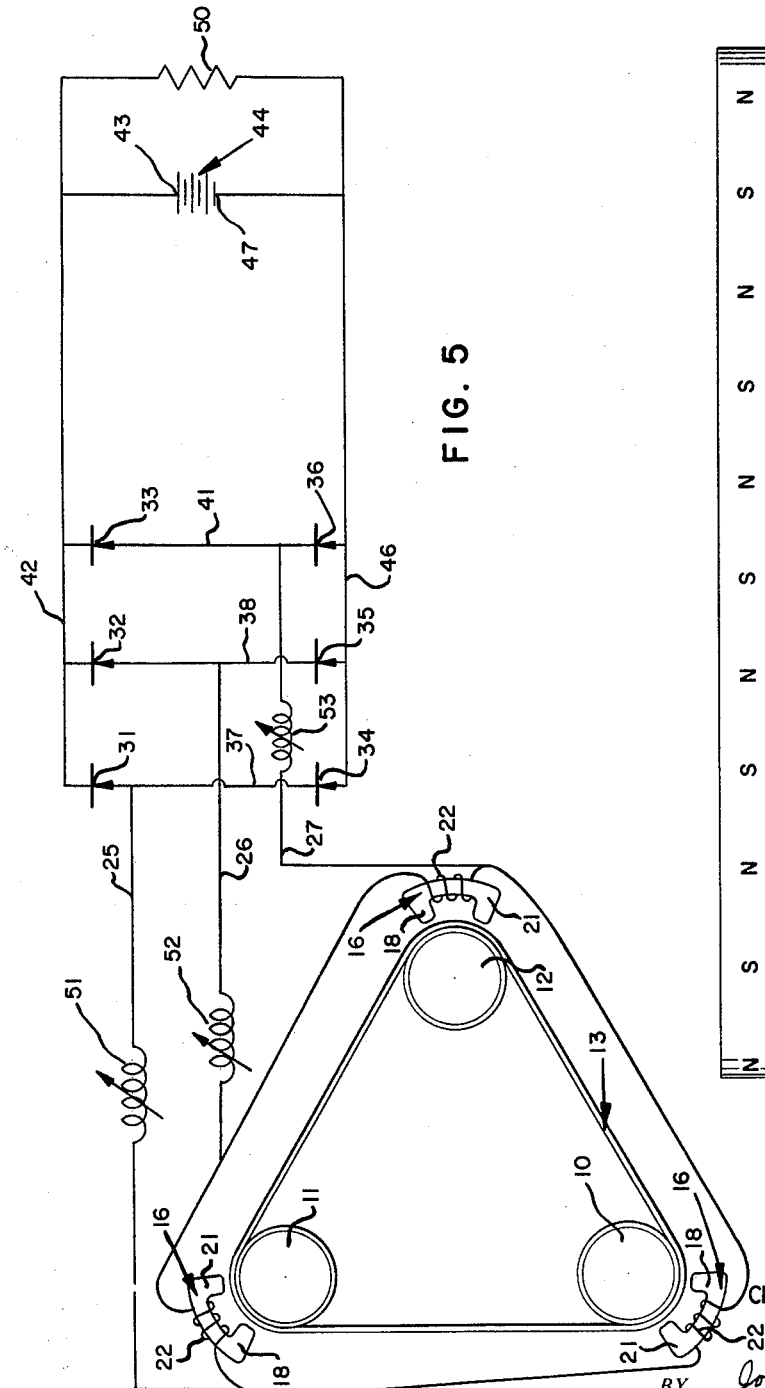
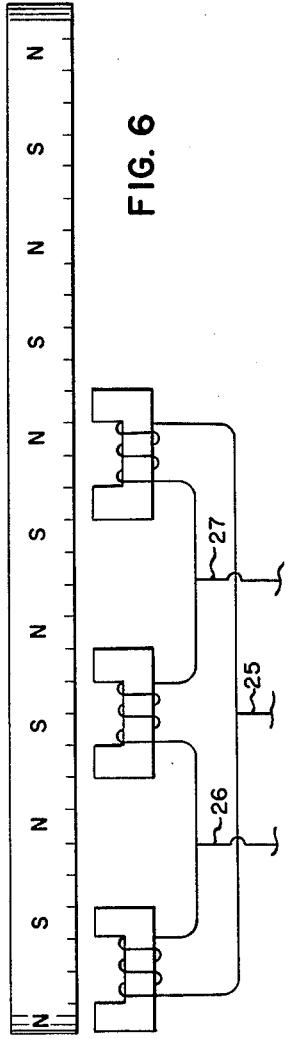

United States Patent Office 3,151,285
Patented Sept. 29, 1964

3,151,285
ELECTRICAL GENERATOR
Challenor W. Rainey, Dearborn, Mich., assignor to Ford Motor Company, Dearborn, Mich., a corporation of Delaware
Filed Aug. 19, 1959, Ser. No. 834,788
11 Claims. (Cl. 320—61)

This invention relates to an electrical generator and more specifically to an engine driven electrical generator employing permanent magnets arranged on a belt driven by the engine.

The invention employs a belt comprising a magnetic material having alternate north and south magnetic poles positioned along its length. The belt is driven by an engine which carries means positioned adjacent the belt for generating an electrical current as the belt moves relative to said means. The belt, including the magnetic material, may be employed to drive various engine accessories from an engine crankshaft and an iron yoke having a winding may be positioned adjacent the belt so that a voltage is induced in the winding which will cause current to flow in an external circuit connected to the winding.

The invention is particularly useful in an automotive electrical system with the electrical current being rectified and employed to charge an electrical storage battery and to supply a load. The magnetic material may be attached to the back surface of the fan belt so that alternate north and south magnetic poles continuously move past winding for inducing voltage therein. It can readily be realized that this invention will eliminate the need for a conventional generator or alternator as presently employed in automotive vehicles, and will perform the function of generating electrical current for the vehicle with a very simple structure.

An object of the present invention is the provision of a simple and inexpensive electrical generator.

Another object of the invention is to provide a linear permanent magnet generator which is simple in operation and construction.

A further object of the invention is the provision of an electrical generator for an automotive vehicle which employs structure used to drive the vehicle accessories.

Still another object is to provide a linear permanent magnet generator for an automotive vehicle which employs a belt used to drive the vehicle engine accessories.

Other objects and attendant advantages of the present invention will become more readily apparent as the specification is considered in connection with the accompanying drawings in which:

FIG. 5 is a diagrammatic view of another embodiment of the invention arranged for polyphase operation; and, FIG. 6 is a diagrammatic view of the belts and iron yokes of the present invention showing the spacing of the magnetic poles relative to the iron yokes.

Figure 1:
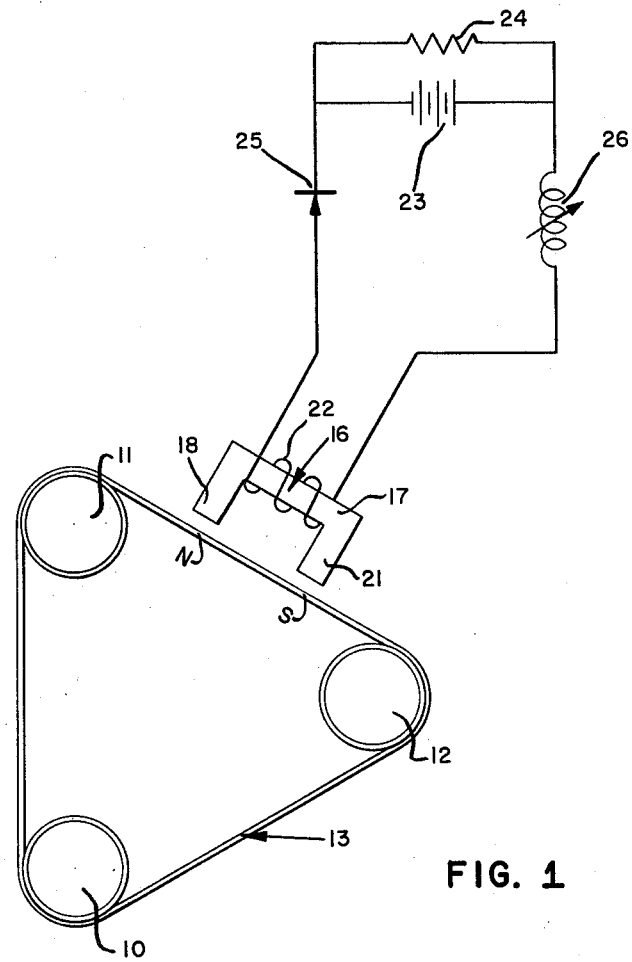
FIG. 1 is a diagrammatic view of the present invention mounted on a motor vehicle engine for single phase operation.

Referring now to the drawings in which like reference numerals designate like parts throughout the several views thereof, there is shown in FIG. 1 a diagrammatic view of the present invention arranged for single phase operation in which an engine driven pulley, such as a pulley attached to the engine crankshaft, is designated by the numeral 10, a water pump and fan pulley is designated by the numeral 11, and a power steering pump pulley or other accessory pulley is designated by the numeral 12. This is a conventional arrangement for an internal combustion engine employed for automotive operation.

Figure 4:
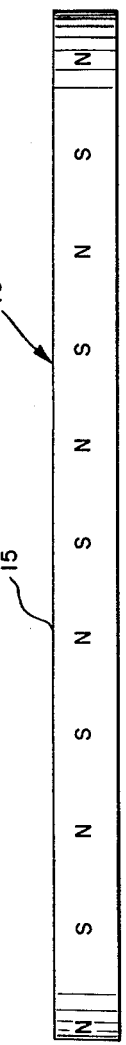
FIG. 4 is a plan view of the belt employed with the present invention.

A belt, generally designated by the numeral 13, extends around the three pulleys and is employed to drive the water pump pulley and the power steering pump pulley from the crankshaft pulley. This belt is shown in cross section in FIG. 2, and includes a conventional drive or fan belt 14. Such belts are commonly employed in the industry and may be constructed of fabric impregnated with an elastomer. A plastic magnetic material 15 is attached to the back surface of the fan belt 14 by means of a suitable adhesive. This plastic magnetic material may be a vinyl plastic described on Page 8 of the April 30, 1959 edition of "Machine Design." The material, as employed in the invention, has magnetic poles arranged side by side along its length as designated in FIG. 4, is completely flexible, and maintains its magnetic strength at least equally as well as conventional permanent magnets.

An iron yoke 16 comprising a main body portion 17 and two legs 18 and 21, extending at right angles to the main body portion, is affixed to the engine of the automotive vehicle adjacent the belt 13. A winding 22 is positioned around the main body portion 17 of the iron yoke. This winding is connected to an electrical storage battery 23 and a load 24 through a rectifier, such as a diode 25, and through a voltage regulator such as a variable inductance designated by the numeral 26.

Figure 3:
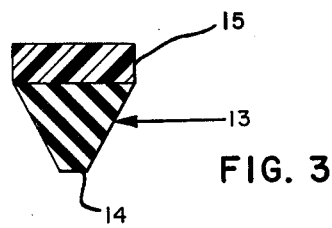
FIG. 3 is a cross sectional view of the belt employed with the present invention.
Figure 2:
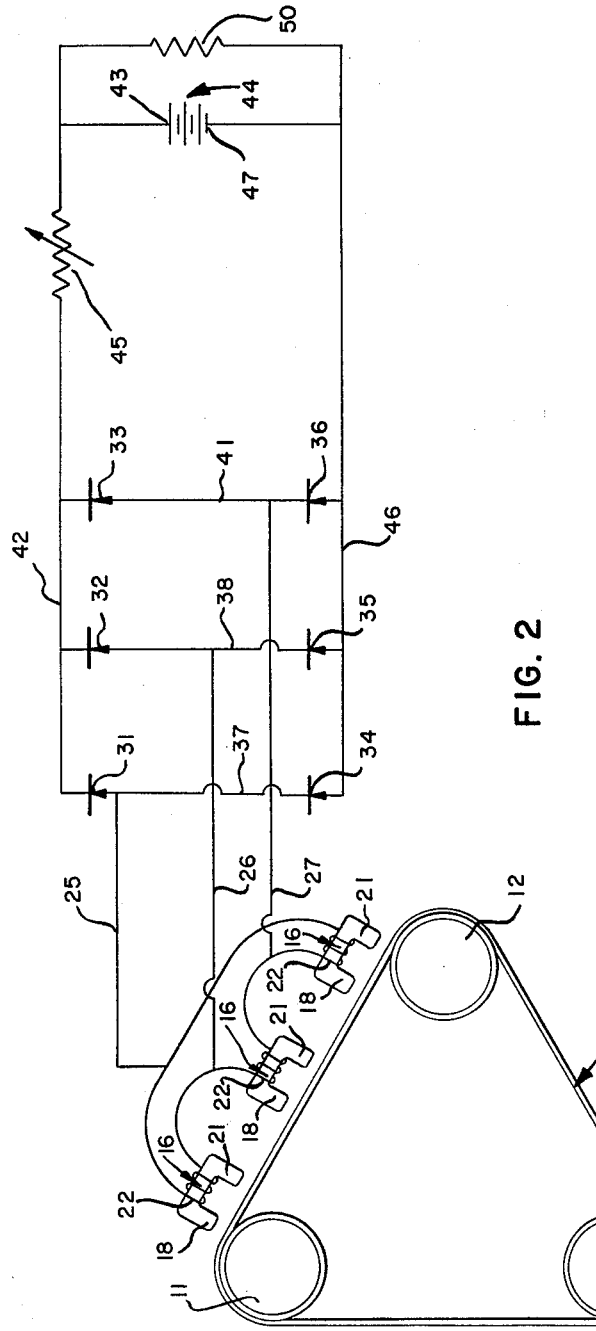
FIG. 2 is a diagrammatic view of the present invention mounted on a motor vehicle for polyphase operation.

Referring now to FIG. 2, there is shown an electrical generator of the present invention arranged for polyphase full wave rectified operation. Although the diagram of FIG. 2 shows the invention arranged for three phase operation, it may be equally arranged for two phase operation. In this embodiment of the invention the same pulleys 10, 11 and 12, shown in FIG. 1 and the same type of belt shown in FIGS. 3 and 4, are employed. A plurality of iron yokes 16 are arranged along the length of the belt between the pulleys 11 and 12. The windings 22 positioned around the iron yokes 16 may be delta-connected with leads 25, 26 and 27 extending from the connections between the windings. A plurality of diodes 31, 32, 33, 34, 35 and 36 are employed to rectify the alternating current output from the windings 16. To accomplish this purpose, the diodes 31 and 34 are connected as shown by means of a lead 37 with the lead 25 from the windings being connected thereto. Similarly, a lead 38 connects diodes 32 and 35 with lead 26 from the windings being connected thereto, and lead 41 connects diodes 33 and 36 with lead 27 from the windings being connected thereto. The positive terminal 42 of this rectifier is connected to the positive terminal 43 of electrical storage battery 44 and to a load 50 through a voltage regulator, such as a variable resistor, designated by the numeral 45. The negative terminal 46 of the rectifier is connected to the negative terminal 47 of the storage battery.

FIG. 5 shows another embodiment of the invention arranged for polyphase operation in which the iron yokes 16 with the windings 22 are positioned over each of the pulleys. The iron yokes are shaped to conform to the pulleys and one iron yoke is positioned adjacent each pulley 10, 11 and 12 respectively. This arrangement will eliminate the effect of belt whip upon the air gap between the magnetic material of the belt and the legs 18 and 21 of the iron yokes.

In addition, the embodiment in FIG. 5 employs variable inductances 51, 52 and 53 located in the leads 25, 26 and 27 respectively to regulate the output voltage of the generator. This type of voltage regulator is more efficient than the variable resistor shown in FIG. 2, since the electrical energy stored in the inductances is returned to the system rather than being dissipated in the form of heat as in a variable resistor.

In the operation of the embodiment of the invention shown in FIG. 1, an alternating current voltage is induced in the winding 22 as the north and south magnetic poles located along the length of the belt 13 move past the legs 18 and 21 of the iron yoke 16. The magnetic poles in the magnetic material 15 should be spaced along the length of the belt at a distance to provide a high reluctance path between said poles in relation to the reluctance of the path defined by the iron yoke 16 and the air gap between the legs 18 and 21 of the iron yoke, and as shown, the spacing is equal to the "on center" distance between the legs 18 and 21. Such an arrangement will provide a reasonable power output from the winding 22.

An alternating current will then flow from the coil 22 and will be rectified by the diode 25 before being fed to the battery 23 and the load 24. The voltage regulator 26 serves to limit the power input to the battery 23 and the load 24.

The operation of the embodiments shown in FIGS. 2 and 5 is similar to the operation of FIG. 1 except that three phase full wave rectified operation is accomplished. It is necessary in these embodiments of the invention to space the yokes 16 along the belt 13 in relation to the spacing of the magnetic poles in the material 15 so that polyphase operation results. For example, if symmetrical three phase operation is desired the iron yokes should be spaced in relation to the magnetic poles so that the output of the windings 22 are 120 electrical degrees apart. This may be accomplished by the spacing shown diagrammatically in FIG. 6. As shown, there are six units of length, taken as any arbitrary unit of distance, between the centers of the north poles and between the centers of the south poles.

Each of the iron yokes spans four of the units of length and are spaced four units apart. If it is desired to space the iron yokes further apart on the belt, other spacings are possible which will be readily apparent to those skilled in the art.

For example, in the embodiment shown in FIG. 5, the spacing of the magnetic poles on the fan belt relative to the iron yokes so that symmetrical three-phase operation will result, will be readily apparent to those skilled in the art from the teachings in FIG. 6.

The iron yokes of the invention may be spaced radially from the fan belt between two of the pulleys as shown diagrammatically in FIGS. 1 and 2, or positioned radially about each of the pulleys as shown in FIG. 5, or they may be disposed along the edge of the belt, that is either in front of or behind the belt in relation to the axis of the engine as shown diagrammatically in FIG. 6. The arrangement shown in FIG. 6 has the advantage that the tension of the belt and the normal inward and outward movement of the belt at different operating speeds will have no effect upon the air gap between the belt and the legs of the yoke. It is apparent that either one or more of the iron yokes may be so disposed depending on whether single phase or polyphase operation is desired.

It is, of course, apparent that the invention may be employed with equal facility and with equal advantage in an automotive vehicle utilizing only a single belt driven accessory. In that case the pulley 12 would be eliminated, the belt 13 would extend around only pulleys 10 and 11, and the iron yoke or yokes would be positioned between the pulleys 10 and 11 adjacent the belt or over the pulley or pulleys as shown by FIG. 5.

Thus, the present invention provides a simple and inexpensive electrical generator which may be conveniently employed with an internal combustion engine of an automotive vehicle.

It will be understood that the invention is not to be limited to the exact construction shown and described, but that various changes and modifications may be made without departing from the spirit and scope of the invention, as defined in the appended claims.

I claim as my invention:

1. In an electrical generator, a belt, means for driving said belt, said belt comprising a permanently magnetized material having alternate north and south magentic poles positioned along its length, said poles being of substantially equal magnetic intensity, and means positioned adjacent said belt for generating an electrical current as a result of movement of the belt relative to said means, said means adapted to provide a low reluctance flux path between said north and south magnetic poles and including a coil means positioned relative to said flux path to generate an electrical current as a result of the relative movement.

2. In an electrical generator, a belt, means for driving said belt, said belt comprising a magnetic material having alternate north and south magnetic poles positioned along its length, means positioned adjacent said belt for generating an electrical current as a result of movement of the belt relative to said means, an electrical storage battery, rectifier means in circuit with said means positioned adjacent the belt, said electrical storage battery being connected to the means positioned adjacent the belt through said rectifier means.

3. In an electrical generator, a first pulley, means for driving said first pulley, a second pulley, a belt extending around said first pulley and said second pulley, said belt comprising a magnetic material having alternate north and south magnetic poles positioned along its length, said poles being of substantially equal magnetic intensity, means positioned adjacent said belt for generating an electrical current as a result of movement of the belt relative to said means, an electrical storage battery, rectifier means connected in circuit with said means positioned adjacent the belt, said electrical storage battery being connected to the means adjacent the belt through said rectifier means.

4. An electrical three phase alternator comprising, a first pulley, means for driving said pulley, a second pulley, a belt extending around said first pulley and said second pulley, said belt including a magnetic material having alternate north and south magnetic poles equally spaced along its length, and means including three windings positioned adjacent said belt and along the length thereof, said windings connected in circuit to transmit a three phase alternating current as a result of the magnetic material moving by said means.

5. In an electrical generating system, a three phase alternator comprising, a first pulley, a second pulley, a belt extending around said first pulley and said second pulley, means for driving said pulleys and said belt, said belt including a magnetic material having alternate north and south magnetic poles spaced along its length, means including three windings positioned adjacent said belt and along the length thereof for generating three phase alternating current as a result of the magnetic material moving by said means, rectifier means connected to said windings for rectifying said three phase alternating current and a storage battery connected to said rectifier means for receiving the rectified current.

6. An electrical polyphase alternator consisting of, a first pulley, means for driving said first pulley, a second pulley, a belt extending around said first pulley and said second pulley, said belt including a magnetic material having alternate north and south magnetic poles spaced along its length, and means including a plurality of windings positioned adjacent said belt and along the length thereof for generating polyphase alternating current as a result of the magnetic material moving by said means.

7. In an electrical generating system, a polyphase alternator comprising, a pulley, means for driving said pulley, a second pulley, a belt extending around said first pulley and said second pulley, said belt including a magnetic material having alternate north and south magnetic poles spaced along its length, means including a plurality of windings positioned adjacent said belt and along the length thereof for generating polyphase alternating current as a result of the magnetic material moving by said means, rectifier means connected to said windings for rectifying said polyphase alternating current and a storage battery connected to said rectifier means for receiving the rectified current.

8. In an electrical generator, a belt, said belt comprising a magnetic material having alternate north and south magnetic poles equally spaced along its length, means providing a low reluctance flux path between said north and south magnetic poles positioned adjacent said belt at one edge thereof, means for moving said belt relative to said first mentioned means, a winding positioned upon said first means for producing electrical energy as a result of the movement of said belt relative to said means.

9. In an electrical generator, a belt, means for driving said belt, said belt comprising a magnetic material having alternate north and south magnetic poles continuously positioned along its length, said poles being of substantially equal magnetic intensity, and means positioned adjacent said belt for generating an electrical current as a result of movement of the belt relative to said means, said means adapted to provide a low reluctance flux path between said north and south magnetic poles and including a coil means positioned relative to said flux path to generate an electrical current as a result of the relative movement.

10. In an electrical generator, a belt, means for driving said belt, said belt comprising a permanently magnetized material having alternate north and south magnetic poles equally spaced along its length, and means positioned adjacent said belt for generating an electrical current as a result of movement of the belt relative to said means, said means adapted to provide a low reluctance flux path between said north and south magnetic poles and including a coil means positioned relative to said flux path to generate an electrical current as a result of the relative movement.

11. In an electrical generator, a belt, means for driving said belt, said belt comprising a magnetic material having alternate north and south magnetic poles equally and continuously spaced along its length, said magnetic poles being of substantially equal magnetic intensity, and means positioned adjacent said belt for generating an electrical current as a result of movement of the belt relative to said means, said means adapted to provide a low reluctance flux path between said north and south magnetic poles and including a coil means positioned relative to said flux path to generate an electrical current as a result of the relative movement.

References Cited in the file of this patent

UNITED STATES PATENTS

| | | |
|---|---|---|
| 453,317 | Townsend | June 2, 1891 |
| 859,019 | Smith | July 2, 1907 |
| 1,897,763 | Nicolet | Feb. 4, 1933 |
| 2,117,018 | Conrad et al. | May 10, 1938 |
| 2,117,019 | Conrad | May 10, 1938 |
| 2,363,336 | Keeler | Nov. 21, 1944 |
| 2,424,218 | Begun | July 22, 1947 |
| 2,557,298 | Leece et al. | June 19, 1951 |
| 2,828,459 | Pear | Mar. 25, 1958 |
| 2,972,023 | Singers | Feb. 14, 1961 |

OTHER REFERENCES

"Machine Design," April 30, 1959, page 8, magnetic material.